United States Patent
Umeyama et al.

(10) Patent No.: US 10,103,363 B2
(45) Date of Patent: Oct. 16, 2018

(54) SEALED BATTERY AND A METHOD FOR MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Yukio Harima, Hirakata (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 201 days.

(21) Appl. No.: 15/173,996

(22) Filed: Jun. 6, 2016

(65) Prior Publication Data

US 2016/0365546 A1    Dec. 15, 2016

(30) Foreign Application Priority Data

Jun. 12, 2015 (JP) ................. 2015-119095

(51) Int. Cl.
*H01M 2/04* (2006.01)
*H01M 2/02* (2006.01)

(52) U.S. Cl.
CPC ....... *H01M 2/0469* (2013.01); *H01M 2/0237* (2013.01); *H01M 2/043* (2013.01); *H01M 2/0426* (2013.01); *H01M 2/0439* (2013.01); *H01M 2/0473* (2013.01); *H01M 2220/20* (2013.01)

(58) Field of Classification Search
CPC .................................................. H01M 2/0426
See application file for complete search history.

(56) References Cited

U.S. PATENT DOCUMENTS

| | | | | |
|---|---|---|---|---|
| 5,798,867 A | * | 8/1998 | Uchida | B23K 26/067 359/618 |
| 2002/0162828 A1 | * | 11/2002 | Spooner | B23K 26/067 219/121.63 |
| 2007/0084551 A1 | * | 4/2007 | Watanabe | B29C 66/8161 156/272.8 |
| 2008/0223831 A1 | * | 9/2008 | Yoshikawa | B23K 26/073 219/121.63 |
| 2009/0233168 A1 | | 9/2009 | Yoshida et al. | |
| 2011/0298160 A1 | * | 12/2011 | Zaitsu | B29C 65/1616 264/497 |

(Continued)

FOREIGN PATENT DOCUMENTS

| | | |
|---|---|---|
| JP | 11-104866 A | 4/1999 |
| JP | 2009-218099 A | 9/2009 |

(Continued)

*Primary Examiner* — Scott J. Chmielecki
(74) *Attorney, Agent, or Firm* — Sughrue Mion, PLLC (57) ABSTRACT

A sealed battery includes: a case main body that has an opening; and a sealing plate that closes off the opening, the sealing plate being joined to the case main body by a weld portion. The weld portion includes a weld bottom surface intersecting with the boundary surface of the case main body and the sealing plane, and the weld bottom surface being substantially orthogonal to the depth direction. A depth of the weld portion on a first virtual plane including the boundary surface, is greater than the depth of the weld portion on a second virtual plane including an outer surface of the case main body, the outer surface being opposite side from the boundary surface in the thickness direction of the case main body.

6 Claims, 8 Drawing Sheets

(56) References Cited

U.S. PATENT DOCUMENTS

| | | | | |
|---|---|---|---|---|
| 2015/0024260 A1* | 1/2015 | Kwak | ............... | H01M 2/02 |
| | | | | 429/178 |
| 2015/0118546 A1* | 4/2015 | Nakayama | ............ | H01M 10/04 |
| | | | | 429/179 |
| 2015/0140413 A1* | 5/2015 | Suzuki | ............... | H01M 2/0426 |
| | | | | 429/163 |
| 2015/0200386 A1* | 7/2015 | Harayama | ............ | H01M 2/0217 |
| | | | | 429/185 |
| 2015/0228936 A1* | 8/2015 | Kajiwara | ............ | H01M 2/0217 |
| | | | | 429/163 |
| 2015/0318517 A1* | 11/2015 | Suzuki | ............... | H01M 2/0217 |
| | | | | 429/185 |
| 2015/0349303 A1* | 12/2015 | Umeyama | ............ | H01M 2/043 |
| | | | | 429/163 |

FOREIGN PATENT DOCUMENTS

| | | |
|---|---|---|
| JP | 2015-228334 A | 12/2015 |
| KR | 10-2014-0077940 A | 6/2014 |

\* cited by examiner

↓ TENSION

| EXAMPLE | SHAPE OF WELD PORTION | d | A | FRACTURE STRENGTH | SHAPE OF FRACTURE PORTION OF CASE MAIN BODY |
|---|---|---|---|---|---|
| 1 |  | 0.3 × D | 0.5 × W (W/A=2) | ○ |  |
| 2 |  | 0.6 × D | 0.5 × W (W/A=2) | ○ |  |
| 3 |  | 0.3 × D | W (W/A=1) | ○ |  |
| 4 |  | 0.6 × D | W (W/A=1) | ○ |  |
| 5 |  | 0.3 × D | 0.3 × W (W/A>2) | ○ |  |
| 6 |  | 0.6 × D | 0.3 × W (W/A>2) | ○ |  |
| 7 |  | 0.6 × D | 1.1 × W (W/A<1) | ○ |  |
| 8 |  | 0.7 × D | 0.5 × W (W/A=2) | ○ |  |
| 9 |  | 0.7 × D | W (W/A=1) | ○ |  |
| 10 |  | D | 1.5 × W (W/A<1) | × |  |

FIG. 12

| EXAMPLE | SHAPE OF WELD PORTION | d | A | FRACTURE STRENGTH | SHAPE OF FRACTURE PORTION OF CASE MAIN BODY |
|---|---|---|---|---|---|
| 11 |  | 0.4 × D | 0.5 × W (W/A=2) | ○ |  |
| 12 |  | 0.7 × D | 0.5 × W (W/A=2) | ○ |  |
| 13 |  | 0.4 × D | W (W/A=1) | ○ |  |
| 14 |  | 0.7 × D | W (W/A=1) | ○ |  |
| 15 |  | 0.4 × D | 0.3 × W (W/A>2) | × |  |
| 16 |  | 0.7 × D | 0.3 × W (W/A>2) | × |  |
| 17 |  | 0.9 × D | 1.1 × W (W/A<1) | × |  |
| 18 |  | 0.9 × D | 0.5 × W (W/A=2) | × |  |
| 19 |  | 0.9 × D | W (W/A=1) | × |  |
| 20 |  | D | 1.25 × W (W/A<1) | × |  |

FIG. 13

| EXAMPLE | SHAPE OF WELD PORTION | d | A | FRACTURE STRENGTH | SHAPE OF FRACTURE PORTION OF CASE MAIN BODY |
|---|---|---|---|---|---|
| 21 | 70, 32, 34 | 0.3 × D | – | ○ | |
| 22 | 70, 32, 34 | 0.4 × D | – | × | |

SEALED BATTERY AND A METHOD FOR MANUFACTURING THE SAME

INCORPORATION BY REFERENCE

The disclosure of Japanese Patent Application No. 2015-119095 filed on Jun. 12, 2015 including the specification, drawings and abstract is incorporated herein by reference in its entirety.

BACKGROUND OF THE INVENTION

1. Field of the Invention

The invention relates to a sealed battery and a method for manufacturing the same.

2. Description of Related Art

One representative structure of a battery is a structure in which a power generating element formed by a positive electrode and a negative electrode stacked together with a separator in between is housed in a battery case, and this battery case is sealed (i.e., a sealed battery). Typically with this sealed battery, the inside of the battery case is sealed by closing off (sealing) an opening of the case main body with a suitable sealing member (for example, a sealing plate) after the power generating element is housed in a case main body. One method for sealing the opening of this battery case involves arranging the sealing member in a position closing off the opening, and then joining the sealing member to an edge of the opening by welding, for example.

The shape of the joint between the edge of the opening of the case main body and the sealing member is typically a corner joint in which an edge portion of one member is butted against an inside wall of the other member. The butted portions of these two members are then welded from the outside of the angle formed by the two members.

When sealing the battery case by joining a sealing member (for example, the sealing plate) that seals the opening of the case main body to the edge of the opening by welding, the weld strength between the case main body and the sealing member (e.g., the sealing plate) may decrease if the weld depth of a weld portion (i.e., a melt-solidified portion that has been melted at the time of welding and then solidified; hereinafter referred to as such) is insufficient at the butt portion of the case main body and the sealing member. Thus, Japanese Patent Application Publication No. 2009-218099 (JP 2009-218099 A) and Japanese Patent Application Publication No. 11-104866 (JP 11-104866 A), for example, describe technology for increasing this weld strength.

JP 11-104866 A describes technology that ensures weld strength of a butt portion of a case main body and a sealing member, by performing welding using a high output, high convergence laser, and increasing the weld depth of the weld portion at the butt portion of the case main body and the sealing member.

However, with the technology described in JP 11-104866 A, if the welding position (typically a laser irradiating position) is off, a desired weld depth may not be able to be ensured at the weld portion of the butt portion of the case main body and the sealing member (i.e., the boundary between the case main body and the sealing member). That is, weld strength at the boundary between the case main body and the sealing member may not be able to be sufficiently ensured due to variation in the battery manufacturing process (e.g., variation in the welding position, variation in the sizes of the case and sealing member, etc.).

Also, if the weld depth of the weld portion is excessive and the location that has melted at the time of welding (i.e., the melted portion) ends up reaching (ends up passing through) the inside wall of the battery case, foreign matter (typically metallic particles) from spatter may end up getting into the battery case at the time of welding. Foreign matter (spatter) that gets into the battery case may cause an internal short in the battery, and is thus undesirable. Also, if the weld depth of the weld portion is too great, a bubble (cavity) is likely to remain after the melted portion solidifies, i.e., a so-called void (also referred to as "blowhole") is likely to form. This void (cavity) reduces the strength of the weld location (weld strength), which leads to a decrease in weld quality and is therefore undesirable. In recent years, the case main body and the sealing member have become progressively thinner in view of increasing battery capacity and reducing battery weight and the like. From this as well, there are cases in which it is difficult to ensure sufficient weld strength only by increasing the weld depth of the weld portion as described in JP 11-104866 A.

JP 2009-218099 A describes technology that ensures the weld depth of a weld portion at a boundary (butt portion) of a case main body and a sealing member, by giving the sealing member a predetermined shape. With the technology described in JP 2009-218099 A, a boundary portion of a non-weld portion and a weld portion of the case main body is parallel to a thickness direction of the case main body, and the area of the boundary portion of the non-weld portion and the weld portion of the case main body is small. Typically, the mechanical strength of the boundary portion of the non-weld portion and the weld portion tends to be less than the mechanical strength of the weld portion and the mechanical strength of the non-weld portion of a welding portion. Therefore, with the technology described in JP 2009-218099 A, even though the joint strength of the boundary (butt portion) of the case main body and the sealing member is able to be increased, there are cases in which it is difficult to ensure sufficient weld strength at the boundary portion of the non-weld portion and the weld portion of the case main body.

SUMMARY OF THE INVENTION

The invention thus provides a sealed battery in which joint strength of a boundary between a case main body and a sealing member is stably ensured, and in which fracturing at a boundary portion of a weld portion and a non-weld portion of a welding member is reduced.

A first aspect of the invention provides a sealed battery including: a case main body that has an opening for housing an electrode body; and a sealing plate that closes off the opening, the sealing plate being joined to the case main body by a weld portion that includes a portion of a boundary surface of the case main body and the sealing plate, and the weld portion being provided along the boundary surface. The weld portion includes a weld bottom surface that is the deepest portion in a depth direction of a weld, the depth direction of the weld being along the boundary surface, the weld bottom surface intersecting with the boundary surface, and the weld bottom surface being substantially orthogonal to the depth direction. The weld portion reaches a first surface of a second member, the second member being a member from among the case main body and the sealing plate, a thickness direction of the second member being perpendicular to the boundary surface, the first surface being a surface on an opposite side from the boundary surface in the thickness direction of the member. A distance from a first position to the weld bottom surface on a first virtual plane, is greater than a distance from a second position to a position of the deepest portion of the weld portion in the depth direction on a second virtual plane. The first position is a position of an outer surface of the weld portion, the first position being on the first virtual plane, the first virtual plane including the boundary surface. The first virtual plane is parallel to the boundary surface. The outer surface is a surface of the weld portion, the outer surface facing outside of the sealed battery. The second position is a position where a line that extends from the first position intersects with the second virtual plane. The second virtual plane is parallel to the boundary surface, the second virtual plane including the first surface. The line extends in a direction perpendicular to the second virtual plane.

In the first aspect, when the distance from the first position to the weld bottom surface on the first virtual plane is D, and the distance from the second position to the position of the deepest portion of the weld portion in the depth direction on the second virtual plane is d, $d \leq 0.7 \times D$ may be satisfied.

In the above aspect, when a thickness of a first member is W, the first member being a member from among the case main body and the sealing plate, a direction along the boundary surface corresponding to a thickness direction of the first member, and a length of the weld bottom surface in a direction orthogonal to the boundary surface is A, $1 \leq W/A \leq 2$ may be satisfied.

According to this aspect, by making the weld portion have the weld bottom portion, the length in the weld depth direction along the boundary surface of the weld portion, on the plane that includes the boundary surface of the a member, from among the case main body and the sealing plate, in which a direction along the boundary surface corresponds to a thickness direction thereof (hereinafter, referred to as first member) and the second member, (i.e., the length D) is able to be stably ensured. For example, even if there is variation in the battery manufacturing process (e.g., variation in the welding position, variation in the sizes of the case and the sealing plate, etc.), a desired length is able to be stably ensured for the length of the weld portion in the weld depth direction along the boundary surface, on the plane that includes the boundary surface of the first member and the second member. That is, the strength of the weld portion is able to be stably ensured on the plane that includes the boundary surface of the case main body and the sealing plate. Also, because the weld portion extends to the outer surface of the second member that is the outer surface on the opposite side in the thickness direction from the boundary surface between the first member and the second member, and $d \leq 0.7 \times D$ is satisfied, the area of the boundary between the weld portion and the non-weld portion of the second member is increased. That is, fracturing at the boundary portion of the weld portion and the non-weld portion of the second member is able to be reduced.

In the above aspect, the thickness W may be equal to or less than 1 mm.

According to this aspect, the area of the boundary between the weld portion and the non-weld portion of the second member is able to be sufficiently ensured. Therefore, even if a thin second member is used, fracturing at the boundary portion of the weld portion and the non-weld portion of the second member is able to be reduced.

In the above aspect, the distance D may be equal to or less than 2 mm.

According to this aspect, even if there is variation in the battery manufacturing process, a desired length is able to be ensured for the length of the weld portion in the weld depth direction along the boundary surface, on the plane that includes the boundary surface of the first member and the second member (i.e., the length D). Therefore, the need to set the length of the weld portion in the weld depth direction of the weld portion larger than desired in consideration of variation in the battery manufacturing process is less. According to the structure described above, the formation of a void (blowhole) is able to be inhibited and foreign matter (spatter) is able to be inhibited from getting into the battery case.

In the above aspect, the first member may be the sealing plate, and the second member is the case main body.

Typically, the thickness of the sealing plate is set larger than the thickness of the case main body. Therefore, by having the first member be the sealing plate, a sufficient length of the weld portion to ensure the strength (fracture strength) of the weld portion on the plane that includes the boundary surface of the case main body and the sealing plate is able to be relatively easily ensured for the length of the weld portion in the weld depth direction along the boundary surface, on the plane that includes the boundary surface of the case main body and the sealing plate (i.e., the length D). Also, with the sealed battery of the aspect of the invention, fracturing at the boundary portion of the weld portion and the non-weld portion of the case main body that is the second member is able to be reduced. That is, with the sealed battery of the above aspect, it is possible to provide a sealed battery in which sufficient fracture strength is ensured at a portion where the case main body and the sealing plate are joined together by welding.

Also, a second aspect of the invention relates to a method for manufacturing any one of the sealed batteries described here. The second aspect includes: joining the case main body and the sealing plate together by laser welding. The laser welding includes lining up three or more mutually independent laser beams in a line in a direction orthogonal to an advancing direction of the weld along the boundary surface, at a laser irradiating portion, and simultaneously irradiating the three or more laser beams such that the three or more laser beams are all the same output.

According to this second aspect, by using a suitable combination of three or more mutually independent laser beams and appropriately irradiating these laser beams at the sealing plate and the case main body that are the welding members, the shape of a portion melted by the laser beams (i.e., the weld portion where the melted portion has solidified) is able to be controlled to a desired shape. As a result, a sealed battery in which the strength of the weld portion on the plane that includes the boundary surface of the case main body and the sealing plate is ensured, and fracturing at the boundary portion of the weld portion and the non-weld portion of the welding members is reduced, is able to be manufactured. That is, a sealed battery in which sufficient fracture strength is ensured for a portion where the case main body and the sealing plate are joined together by welding is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings as appropriate. In this specification, matter that is not particularly mentioned, that is necessary to carry out the invention may be understood to be design matter of one skilled in the art based on the related art in this field. The invention may be carried out based on technical common knowledge in the field and the content described in this specification. In the drawings described below, like reference characters will be used to denote members and portions that perform the same operation. Also, dimensional relationships (length, width, thickness and the like) in the drawings do not reflect the actual dimensional relationships.

The battery of according to an example embodiment of the invention is a sealed battery in which a sealing plate and a case main body of a battery case are joined together by welding, as described above, and is characterized by the shape of the weld portion. Therefore, the type and structure of electrolyte and electrode body are not particularly limited. Typical examples of the battery provided by the example embodiment of the invention include a wide variety of primary batteries, and secondary batteries and the like. Here, "secondary batteries" is a term that refers to batteries that are able to repeatedly charge and discharge in general, and includes so-called chemical batteries such as lithium secondary batteries, sodium secondary batteries, and nickel-metal-hydride secondary batteries, and physical batteries such as electric double layer capacitors.

Here, the overall structure of the sealed battery described here is a sealed battery in which an electrode body that includes a positive electrode and a negative electrode is housed together with electrolyte, not shown, in a battery case, similar to a conventional battery. This battery case includes a case main body within which the electrode body that is a power generating element is housed, and a sealing plate. The shape of this battery case is not particularly limited, and may be cylindrical or square or the like.

Hereinafter, although not intended to be particularly limiting, the structure of the battery according to the invention will be described in detail using a square sealed battery 100 shown in FIG. 1 as an example.

Figure 1:
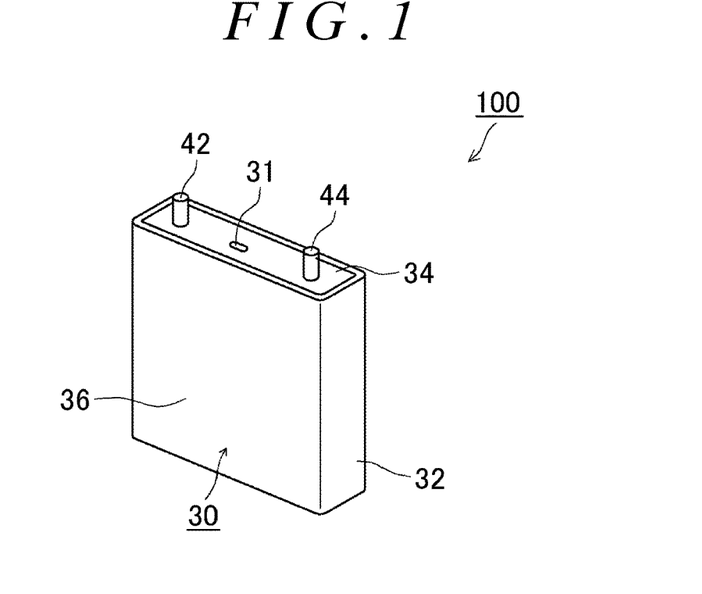
FIG. 1 is a perspective view showing a frame format of the outer shape of a battery according to one example embodiment of the invention.
Figure 2:
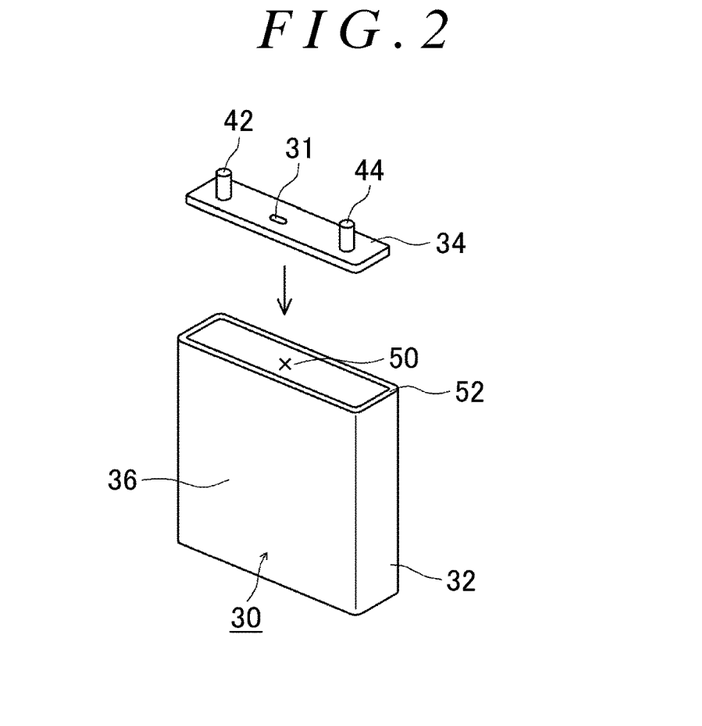
FIG. 2 is a view showing a frame format of the relationship between a case main body and a sealing plate of the battery according to the example embodiment of the invention.

FIG. 1 is a perspective view of the outer shape of the sealed battery 100 according to this example embodiment. As is shown in the drawing, a battery case 30 is a square case that includes a case main body 32 and a sealing plate 34. As shown in FIGS. 1 and 2, the case main body 32 is a cuboid-shaped case that includes a side wall 36 that forms a side surface of the case main body, and a bottom portion, not shown. This case main body 32 has a rectangular opening 50 for housing the electrode body at one end (which corresponds to an upper end portion when the battery is in a normal usage state). An open end surface 52 extends out horizontally on an upper surface of the side wall 36. The open end surface 52 is formed on the upper surface of the side wall 36 that forms a peripheral edge of this opening 50.

The sealing plate 34 is a plate-shaped member that closes off the opening 50 of the case main body 32. Here, the sealing plate 34 may have a generally rectangular shape. Also, as shown in FIGS. 1 and 2, a positive electrode terminal 42 and a negative electrode terminal 44 for external connection are provided on the sealing plate 34 such that a portion of each of these terminals protrudes outside the battery 100 from an outer surface of the sealing plate 34 (i.e., a surface positioned outside of the battery case 30 when the opening 50 of the case main body 32 is closed off; hereinafter referred to as such). Also, a safety valve 31 for discharging gas generated inside the battery case 30 outside of the battery case and a fill port, not shown, for filling electrolyte into the battery case are provided in the sealing plate 34.

The material of the case main body 32 and the sealing plate 34 is not particularly limited as long as it is material that is able to be welded. For example, the case main body 32 and sealing plate 34 may be made of metal. In particular, metal material that is both lightweight and has excellent thermal conductivity is preferable. Examples of such metal material include aluminum, stainless steel, and nickel-plated steel and the like. Still more preferable material is aluminum or an aluminum alloy that is both lightweight and has good thermal conductivity. Also, the case main body 32 and the sealing plate 34 may both be made of the same material or different materials. The case main body 32 and the sealing plate 34 of the same material will have the same physical properties such as thermal conductivity and melting temperature, so there will be no unevenness in the melting of the metal from the heat from welding, which is preferable. In this example embodiment, the case main body 32 and the sealing plate 34 are both made of aluminum.

Figure 3:
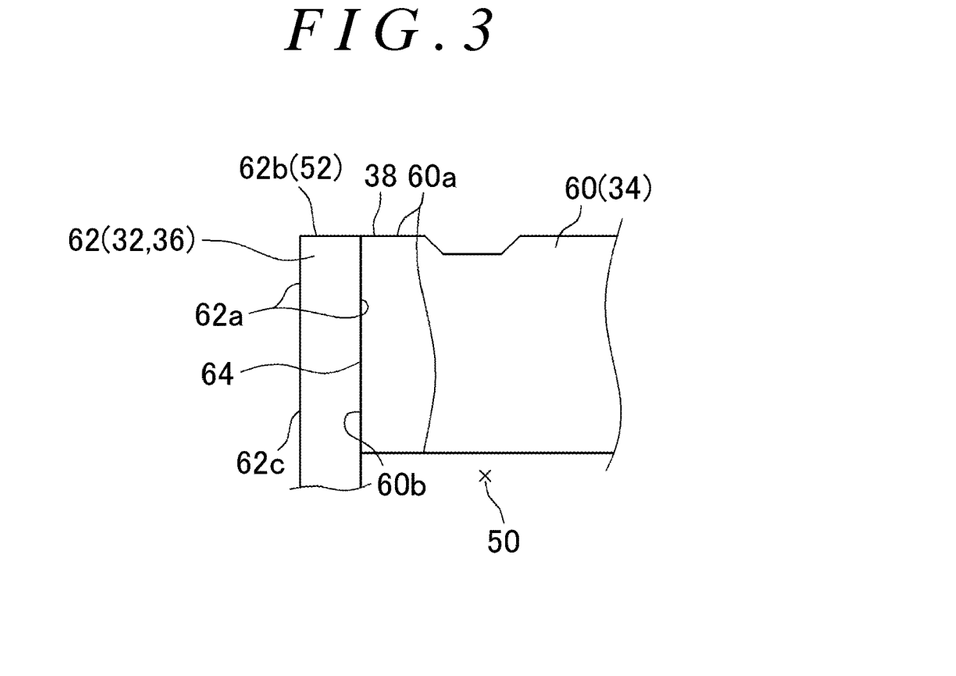
FIG. 3 is a view showing a frame format of a joining portion of the sealing plate and the case main body (a first member and a second member) of the battery shown in FIG. 1, which is a sectional view of a cross-section orthogonal to a boundary surface of the sealing plate and the case main body (the first member and the second member)
Figure 10:
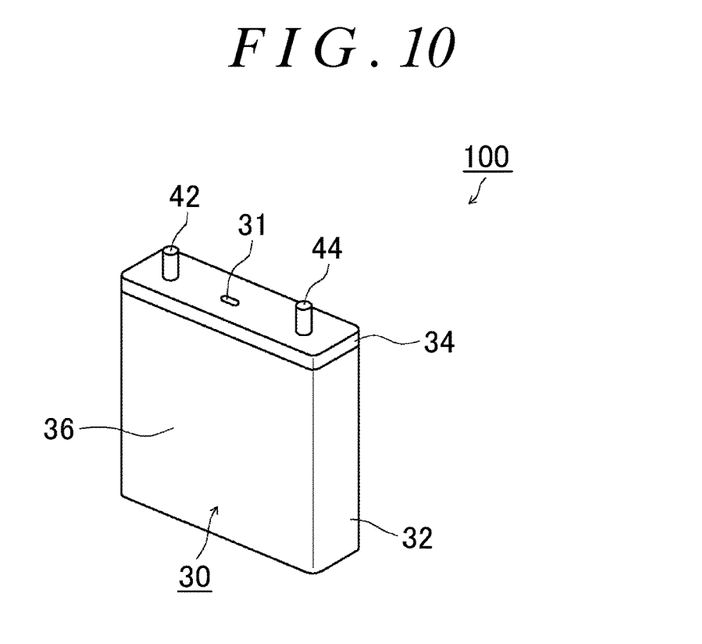
FIG. 10 is a perspective view showing a frame format of the outer shape of a battery according to another example embodiment of the invention.

The battery case 30 is equipped with the sealing plate 34 to close off the opening 50 of the case main body 32. For example, as shown in FIGS. 1 and 2, the opening 50 of the case main body 32 is able to be closed off by inserting (fitting) the sealing plate 34 into the opening 50 of the case main body 32. At this time, the case main body 32 and the sealing plate 34 are arranged such that the outer surface 38 of the sealing plate 34 is flush with the open end surface 52 of the case main body 32 (i.e., in a state in which these are on the same plane), as shown in FIG. 3. Alternatively, for example, the opening 50 of the case main body 32 may also be closed off by placing the sealing plate 34 on top of the open end surface 52, as shown in FIG. 10. At this time, the case main body 32 and the sealing plate 34 are arranged such that an outer wall surface of the side wall 36 of the case main body 32 is flush with a peripheral edge side surface of the sealing plate 34 (i.e., in a state in which these are on the same plane). Alternatively, for example, a peripheral edge of the sealing plate 34, and/or a side wall that forms the opening of the case main body 32, may be formed in a predetermined shape, and both of these members may be fit together. Then, the case main body 32 and the sealing plate 34 are joined together at a predetermined region that includes a portion of a boundary surface of the case main body 32 and the sealing plate 34, by welding in a direction along the boundary surface. As a result, the opening 50 of the case main body 32 is closed off without any clearance by the sealing plate 34, thus enabling the battery case 30 to be sealed.

Hereinafter, a weld portion (weld structure) where the case main body 32 and the sealing plate 34 are welded will be described with a member, from among the case main body 32 and the sealing plate 34 that are welding members, in which a direction along the boundary surface of the case main body 32 and the sealing plate 34 corresponds to a thickness direction of the welding member, as a first member 60, and the other as a second member 62. In this example embodiment, an example will be described in which the sealing plate 34 is the first member 60, and the case main body 32 is the second member 62.

The first member 60 and the second member 62 are butted together in a direction in which wide surfaces (60a and 62a) thereof are orthogonal to each other, as shown in FIG. 3. At this time, a side surface 60b of the first member 60 butts against an end portion of a wide surface 62a of the second member 62 that is positioned on the inside of the battery case 30, such that the wide surface 62b of the second member 62 is flush with a wide surface 60a of the first member 60 that is positioned on the outside of the battery case 30. This butting may be the butting of two members in which both the side surface 60b of the first member 60 that faces the second member 62 and the wide surface 62a of the second member 62 that faces the first member 60 are flat, or the butting of the first member 60 and the second member 62 may be realized by fitting together two members of which at least one is formed having a predetermined shape.

Figure 4:
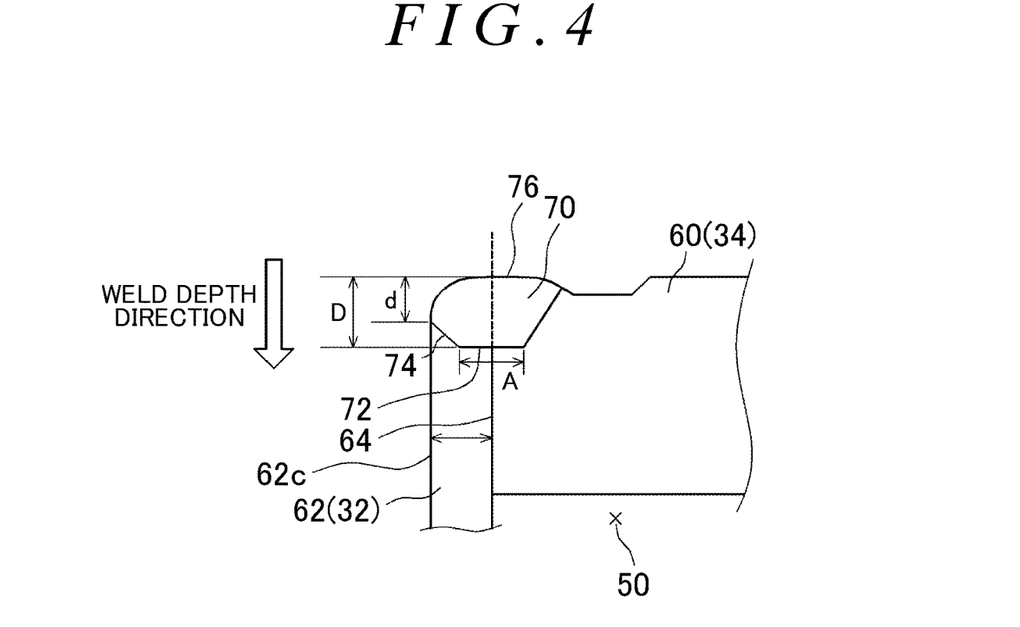
FIG. 4 is a view showing a frame format of the shape of a weld portion of the battery according to the example embodiment of the invention, which is a sectional view of a cross-section orthogonal to the boundary surface of the sealing plate and the case main body (the first member and the second member)

As shown in FIG. 4, the first member 60 and the second member 62 are joined at a predetermined region that includes a portion of a boundary surface 64 of the first member 60 and the second member 62, by welding in a direction along the boundary surface 64. Below, regarding the weld depth direction of the weld portion 70 formed by this welding, unless otherwise specifically described, the direction along the boundary surface 64 of the first member 60 (the sealing plate 34) and the second member 62 (the case main body 32) will be described as the weld depth direction. The weld portion 70 that welds the first member 60 and the second member 62 together has a weld bottom surface 72 that is the deepest portion in the depth direction of the weld and is substantially parallel to a virtual plane that is orthogonal to the depth direction of the weld, as shown in the drawing. That is, the weld bottom surface 72 is substantially perpendicular to the depth direction of the weld. As a result of the weld portion 70 having this weld bottom surface 72, it is possible to ensure a length of the weld portion 70 (denoted as "D" in FIG. 4) in the weld depth direction, on a plane that includes the boundary surface 64 of the first member 60 and the second member 62, even if deviation occurs in the manufacturing process of the battery. As a result, the strength of the weld portion 70 on the plane that includes the boundary surface 64 of the first member 60 and the second member 62 is able to be stably ensured. From the viewpoint of ensuring the length of the weld portion 70 in the weld depth direction of on the plane that includes the boundary surface 64 of the first member 60 and the second member 62, the weld bottom surface 72 is preferably arranged in a position intersecting with (orthogonal to) the plane that includes the boundary surface 64 of the first member 60 and the second member 62. For example, when the weld bottom surface 72 is divided by the plane that includes the boundary surface 64 of the first member 60 and the second member 62, the weld bottom surface 72 is preferably arranged such that at least 10% (more preferably 20%, even more preferably 40%, and still more preferably 50%) of the weld bottom surface 72 is positioned on the first member 60 side or the second member 62 side.

Here, the weld bottom surface 72 being "substantially parallel" to the virtual plane that is orthogonal to the weld depth direction is not limited only to a case in which it is completely parallel. That is, "substantially parallel" also includes a case in which the weld bottom surface 72 appears to be close to parallel to the virtual plane that is orthogonal to the weld depth direction. Similarly, "substantially orthogonal" is not limited only to completely orthogonal. "Substantially orthogonal" includes a state that is seemingly close to orthogonal. For example, the weld bottom surface 72 is not limited to a completely flat surface, and may have minute asperities. Therefore, with the weld bottom surface 72, when an approximate plane of the weld bottom surface 72 is set, asperities (deviations) of no more than approximately 30 μm (preferably no more than 15 μm) from this approximate plane may be allowed. Also, with the weld bottom surface 72, a slope within a range of −10 degrees to +10 degrees with respect to the virtual plane may be allowed for the approximate plane of the weld bottom surface.

As shown in FIG. 4, the weld portion 70 extends to an outer surface of the second member 62, which is the outer surface on the opposite side from the boundary surface 64 of the first member 60 in the thickness direction (hereinafter, this outer surface may also be referred to simply as "outside wide surface 62c of the second member 62"). Here, the length of a portion of the weld portion 70 that is closer the outside wide surface 62c of the second member 62 than the weld bottom surface 72, in the weld depth direction becomes smaller (i.e., the weld depth at this portion is shallower) with getting closer to the outside wide surface 62c of the second member 62. That is, a boundary 74 between a non-weld portion of the second member 62 and the weld portion 70 at the outside wide surface 62c of the second member 62 is positioned farther to the outer surface side (typically the side with the surface to which thermal energy is applied) of the weld portion than the weld bottom surface 72. Therefore, the area of the boundary 74 between the weld portion 70 and the non-weld portion of the second member 62 is able to be increased compared to when the boundary 74 between the weld portion 70 and the non-weld portion of the second member 62 is parallel to the thickness direction of the second member 62 (i.e., when the weld bottom surface 72 extends to the outside wide surface 62c of the second member 62). As a result, fracturing at the boundary portion of the weld portion 70 and the non-weld portion of the second member 62 is able to be reduced.

Here, as shown in FIG. 4, a length of the weld portion 70 in the weld depth direction on the plane that includes the boundary surface 64 of the first member 60 and the second member 62 is D (mm). That is, the length D refers to the distance from a first position that is a position of the outer surface of the weld portion 70, on a first virtual plane that includes the boundary surface 64 and is parallel to the boundary surface 64, to the weld bottom surface 72 on the first virtual plane. Here, the outer surface of the weld portion 70 is a surface of the weld portion that faces the outside of the sealed battery. A distance in the weld depth direction from an outer surface 76 of the weld portion 70 on the plane that includes the boundary surface 64 of the first member 60 and the second member 62, to the boundary 74 between the non-weld portion of the second member 62 and the weld portion 70 at the outside wide surface 62c of the second member 62, is d (mm). That is, the distance d is the distance from a second position where a line that extends from the first position, in a direction perpendicular to a second virtual plane that includes the first position and is parallel to the boundary surface 64, intersects with the second virtual plane, to the position of the deepest portion of the weld portion in the depth direction on the second virtual plane. When the thickness of the second member 62 is W (mm) and the length of the weld bottom surface 72 in a direction orthogonal to the boundary surface 64 of the first member 60 and the second member 62 is A (mm), these satisfy the following relationships: $d \leq 0.7 \times D$, and $1 \leq W/A \leq 2$. The thickness W of the second member 62 is the thickness of a portion of the second member 62 that faces the first member 60.

By having $W/A \leq 2$ as described above, even if there is variation in the battery manufacturing process (e.g., variation in the sizes of the first member 60 and second member 62 or variation in the welding position), the length of the weld portion 70 in the weld depth direction on the plane that includes the boundary surface 64 of the first member 60 and the second member 62 (i.e., the weld depth, the length D) can be stably ensured. That is, the strength of the weld portion 70 on the plane that includes the boundary surface 64 of the first member 60 and the second member 62 is able to be stably ensured.

On the other hand, if W/A is too small (i.e., if the A is too large with respect to the W), a portion of the weld portion 70 that is closer to the outside wide surface 62c of the second member 62 than the weld bottom surface 72, i.e., a portion of the weld portion 70 where the distance in the weld depth direction becomes smaller (i.e., where the weld depth becomes shallower) with getting closer to the outside wide surface 62c of the second member 62, is unable to be sufficiently ensured. Therefore, the area of the boundary 74 between the weld portion 70 and the non-weld portion of the second member 62 will tend to be small. Also, if the distance d is too large with respect to the length D, the effect of increasing the area of the boundary 74 between the weld portion 70 and the non-weld portion of the second member 62 due to decreasing the length in the weld depth direction (i.e., due to the weld depth becoming shallower), at the portion of the weld portion 70 that is closer to the outside wide surface 62c of the second member 62 than the weld bottom surface 72, is unable to be sufficiently displayed. Therefore, by making $1 \leq W/A$, and $d \leq 0.7 \times D$, an area sufficient to inhibit fracturing at the boundary portion of the weld portion 70 and the non-weld portion of the second member 62 is able to be ensured as the area of the boundary 74 between the weld portion 70 and the non-weld portion for the second member 62.

Here, the thickness W of the second member 62 is not particularly limited, but typically it may be equal to or less than 1.5 mm (e.g., equal to or less than 1.0 mm). With the technology described here, even if a second member 62 with a small thickness is used, an area sufficient to inhibit fracturing at the boundary portion of the weld portion 70 and the non-weld portion of the second member 62 is able to be ensured as the area of the boundary 74 between the weld portion 70 and the non-weld portion for the second member 62. On the other hand, if a second member 62 that is too thin is used, the strength of the second member 62 will tend to be insufficient. Therefore, the thickness W of the second member 62 may typically be equal to or greater than 0.3 mm. For example, the thickness W of the second member 62 may be within a range of 0.4 mm to 0.5 mm.

The thickness of the first member 60 (referred to as the "thickness of the first member 60 of a portion facing the second member 62") is not particularly limited. Typically, the thickness of the first member 60 may be greater than the thickness of the second member 62. By setting the thickness of the first member 60 large, the length of the weld portion 70 in the weld depth direction on the plane that includes the boundary surface 64 of the first member 60 and the second member 62 (i.e., the length D) is able to be set large. The thickness of the first member 60 may be approximately three to four times the thickness of the second member 62, for example. More specifically, the thickness of the first member 60 may be in a range of no less than 0.9 mm (e.g., no less than 1.2 mm) to no more than 6 mm (e.g., no more than 4 mm).

The length of the weld portion 70 in the weld depth direction on the plane that includes the boundary surface 64 of the first member 60 and the second member 62 (i.e., the length D (mm)) is not particularly limited as long as sufficient strength is able to be ensured at the weld portion 70 on the plane that includes the boundary surface 64 of the first member 60 and the second member 62. For example, this length D (mm) may be approximately the same as, or greater than, the thickness W (mm) of the second member 62. Preferably, the length D (mm) may be set in a range of greater than the thickness W of the second member 62 to no more than 1.5 times the thickness W (mm) of the second member 62 (i.e., within a range of $W < D \leq 1.5 \times W$). Here, if the length D is too large with respect to the thickness of the first member 60, the weld portion 70 may pass through the first member 60, which is not desirable. Therefore, the length D is preferably set such to no more than $\frac{2}{3}$ (more preferably, to no more than $\frac{1}{2}$) of the thickness of the first member 60. From the viewpoint of avoiding weld defects such as voids in the weld portion 70 as well, a length D that is too large is not desirable. From these viewpoints, the length D may be set to within a range of, for example, no less than 0.3 mm (more preferably, no less than 0.4 mm) to no more than 2 mm (more preferably, no more than 1 mm). Typically, the length D may be approximately 0.6 mm.

Here, with a typical sealed battery, the sealing plate 34 is provided with positive and negative external terminals (42 and 44), a fill port, not shown, for filling electrolyte into the battery case, and a safety valve 31 and the like, as shown in FIG. 1 or 10. Normally, the thickness of the sealing plate 34 is set large because external force may be applied to these portions at the time of manufacture and use. That is, typically, the thickness of the sealing plate 34 is set greater than the thickness of the case main body 32. Therefore, the first member 60 may preferably be the sealing plate 34, and the second member 62 may preferably be the case main body 32. That is, as shown in FIGS. 3 and 4, the inside of the battery case 30 is able to be sealed by the side surface 60b of the sealing plate 34 (the peripheral edge side surface of the sealing plate 34) being butted against the inner wall surface of the side wall 36 of the case main body 32, and a predetermined region that includes a portion of the boundary surface 64 of the case main body 32 and the sealing plate 34 being joined by welding. More specifically, the sealing plate 34 is able to be fitted into the opening 50 formed by the side wall 36 of the case main body 32, as shown in FIGS. 1 and 2.

The electrode body housed inside the battery case 30 may be the same as that of a conventional battery, and is not particularly limited. Typically, a structure in which a positive electrode and a negative electrode are electrically separated (insulated) by a separator may be employed. For example, the electrode body may be a stacked electrode body or a rolled electrode body. For example, the electrode body may be a flat rolled electrode body that is formed in a flat shape by overlapping a long positive electrode and a long negative electrode via two long separators (for example, porous polyolefin resin sheets) and rolling them in the length direction, and then crushing and squashing the rolled body from a direction orthogonal to the rolling axis. The positive electrode may be an electrode in which a positive-electrode active material layer that includes positive-electrode active material is formed on one or both sides of a positive electrode collector (e.g., aluminum foil), for example. Also, the negative electrode may be an electrode in which a negative-electrode active material layer that includes negative-electrode active material is formed on one or both sides of a negative electrode collector (e.g., aluminum foil), for example.

Also, the electrolyte housed inside of the battery case 30 may also be the same as that used in a conventional battery and is not particularly limited. For example, the electrolyte may be a non-aqueous electrolyte that includes a supporting salt (a supporting electrolyte) in a suitable non-aqueous solvent (an organic solvent), for example.

Here, members (e.g., the positive electrode, the negative electrode, and the separators and the like) and materials that form the electrode body, and the electrolyte described above, that are the same as those used in a conventional typical battery may be used without limitation. The materials and the like that form the electrode body and the composition and the like of the electrolyte do not characterize the invention, so detailed descriptions thereof will be omitted.

Next, one example embodiment of a process for manufacturing the sealed battery 100 having the structure described above, relating to a manufacturing method of the sealed battery according to an example embodiment of the invention, will be described with reference to the drawings as appropriate. The manufacturing method of the sealed battery of the invention is in no way limited to the example embodiment described below.

The manufacturing method of the sealed battery 100 described here includes joining the case main body 32 and the sealing plate 34 together by welding. Hereinafter, a mode in which the sealing plate 34 is the first member 60 and the case main body 32 is the second member 62 will be described as an example.

First, the opening 50 of the case main body 32 is closed off by the sealing plate 34. For example, the case main body 32 having the opening 50 for housing the electrode body at one end (which corresponds to the upper end portion when the battery is in a normal usage state), and the sealing plate 34 having a shape that closes off the opening 50, are prepared, as shown in FIG. 2. Then, the opening 50 of the case main body 32 is closed off with the sealing plate 34. More specifically, the sealing plate 34 and the case main body 32 are butted together in a direction in which wide surfaces (60a and 62a) are orthogonal to each other, as shown in FIG. 3. At this time, the side surface 60b of the sealing plate 34 (i.e., the peripheral edge side surface of the sealing plate 34) is butted against the inner wall surface of the side wall 36 of the case main body 32, such that the open end surface 52 of the case main body 32 is flush with the outer surface 38 of the sealing plate 34. For example, the sealing plate 34 may be fit into the opening 50 of the case main body 32.

Next, the case main body 32 and the sealing plate 34 are joined together by welding. This welding is performed by applying thermal energy from outside the battery case 30, in a direction along the boundary surface 64 of the case main body 32 and the sealing plate 34, i.e., in a direction orthogonal to the flush surface where the case main body 32 and the sealing plate 34 are butted together. That is, the direction in which the thermal energy is applied to the case main body 32 and the sealing plate 34 that are the welding members (typically the laser irradiating direction) matches the depth direction of the weld. Also, the welding is typically performed going around along the boundary surface 64 of the case main body 32 and the sealing plate 34. Hereinafter, the direction in which welding advances will be referred to as the "welding direction".

The procedure for housing the electrode body and the electrolyte in the battery case 30 is not particularly limited. For example, the electrode body may be housed inside the battery case 30 by attaching the electrode body to the sealing plate 34 by a predetermined procedure, and inserting the electrode body into the case main body 32 when closing off the opening 50 of the case main body 32 with the sealing plate 34. Also, the electrolyte may be housed inside the battery case 30 by filling the electrolyte into the battery case 30 from the fill port formed in the sealing plate 34. Here, the electrode body and the non-aqueous electrolyte described above may be used.

Hereinafter, the procedure for welding the case main body 32 and the sealing plate 34 together will be described in detail. In the description below, the sealing plate 34 will be described as the first member 60, and the case main body 32 will be described as the second member 62.

The welding is typically performed by laser welding using any one of a variety of laser light (typically a laser beam) or electron beam welding using an electron beam. Any one of a variety of lasers, such as a gas laser, a solid-state laser, a liquid laser, a semiconductor laser, or a fiber laser may be used without particular limitation, as the laser. For example, a YAG laser, a $YVO_4$ laser, a $CO_2$ laser, a semiconductor laser, or a fiber laser or the like may be preferably used.

Here, the welding is performed with the weld portion 70 extending to the surface on the opposite side in the thickness direction from the boundary surface 64 of the first member 60 and the second member 62, which is the outer surface of the second member 62 (i.e., the outside wide surface 62c).

The input heat from welding is normally transferred in a direction orthogonal to the laser irradiating direction, that is, in a direction orthogonal to the boundary surface 64 of the first member 60 and the second member 62 (i.e., in the thickness direction of the second member 62) (heat transfer). Then, when the input heat from the welding is transferred and the corner of the second member 62 melts, the input heat is transferred in the weld depth direction along the outside wide surface 62c of the second member 62. Therefore, the weld portion 70 is able to reach to the outside wide surface 62c of the second member 62 by applying sufficient input heat by the welding.

Figure 5:
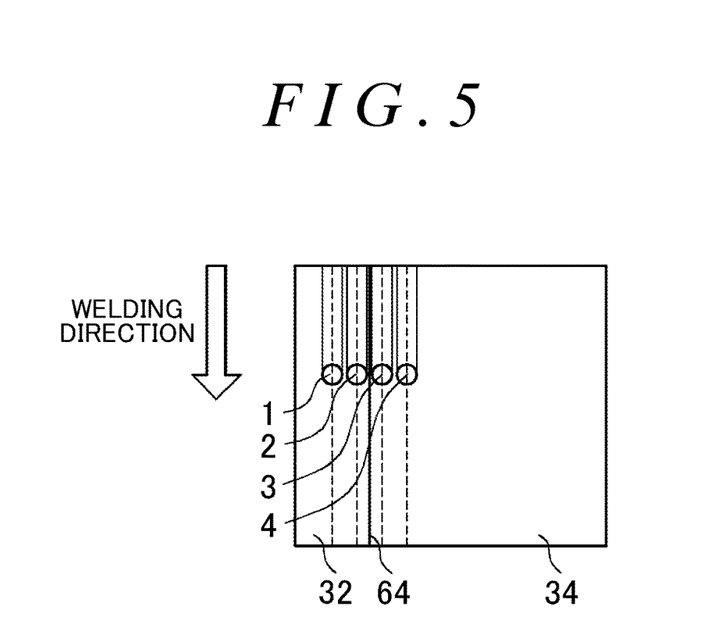
FIG. 5 is a view showing a frame format of one example embodiment of a method for joining the case main body and the sealing plate together by welding, in which a laser irradiating position is viewed from a laser irradiating direction.

Here, as shown in FIG. 5, the welding is typically performed such that three or more (e.g., four or more) laser beams (1 to 4 in the drawing) that are mutually independent are lined up in a row in a direction orthogonal to the welding direction at a laser irradiating portion. That is, welding is performed with three or more laser beams running parallel or substantially parallel to the welding direction. The broken lines in the drawing are virtual lines (the same is also true for FIGS. 6 to 8 described later) that indicate the paths of the laser beams. Typically, keyhole welding is performed continuously (continuous welding) by each laser beam. At this time, the welding members around the laser irradiating portion where the laser beams are irradiated are able to be melted by input heat from the laser welding being heat transferred thereto. That is, the welding members between the laser irradiating portions of adjacent laser beams are able to be melted by the input heat from the laser welding being transferred thereto. Therefore, by arranging the plurality of laser beams at intervals at which the portions melted by the laser beams overlap, the melted portions that are melted by the plurality of laser beams are integrated with one another such that a single melted portion is formed. Then, the weld portion 70 having a desired shape is able to be formed by the melted portion solidifying. Therefore, the weld portion 70 that has the weld bottom surface 72 that is the deepest portion in the depth direction of the weld (i.e., the laser irradiating direction) and that is substantially parallel to a virtual plane orthogonal to the depth direction of the weld, is able to be formed by adjusting the intervals between the laser beams and the laser intensity and the like. The intervals of the laser beams and the laser intensity and the like may change depending on the material and thickness of the case main body 32 and the sealing plate 34 that are the welding members, and the depth of the weld and the like, and are therefore are not particularly limited, and need only be adjusted to within a range that enables the weld bottom surface 72 to be formed. From the viewpoint of forming the weld bottom surface 72, the three or more laser beams are preferably arranged at equally-distant intervals, and the laser beams are preferably simultaneously irradiated so as to all be the same laser intensity. The laser intensity referred to here refers to the amount of output of the laser.

From the viewpoint of controlling the shape of the weld portion 70 to a desired shape (e.g., the shape described above, typically the shape shown in FIG. 4), a laser beam having a small laser irradiation diameter is preferably used. For example, a fiber laser in which optical fiber is the medium may be preferably employed because the irradiation diameter of the laser beam is small (the condensing diameter is small) and the beam quality is excellent. The laser irradiation diameter of the laser beam is not particularly limited, but a range of no less than 0.01 mm (preferably no less than 0.03 mm) and no more than 0.1 mm (preferably no more than 0.08 mm) is preferable.

Here, the laser irradiating position is preferably adjusted such that the plurality of laser beams that are lined up in a row are irradiated at both the first member 60 and the second member 62. The irradiating position of the laser beams is preferably adjusted such that an offset of the center in the parallel direction of the plurality of laser beams from the boundary surface 64 of the first member 60 and the second member 62 is no more than 40% (more preferably, no more than 30%, even more preferably, no more than 20%, and even more preferably still, no more than 10%) of the length in the parallel direction of the plurality of laser beams. For example, the laser beams are lined up such that the offset of the center in the parallel direction of the plurality of laser beams from the boundary surface 64 of the first member 60 and the second member 62 is no more than 0.2 mm (more preferably, no more than 0.1 mm). More preferably, the laser irradiating position of the laser beams is set such that the center of the alignment of the plurality of laser beams is aligned with the boundary surface 64 of the first member 60 and the second member 62.

The shape of the weld portion 70 is able to be controlled by changing the number of laser beams, the intervals of the laser beams, the output intensity of the laser beams, the timing of the laser irradiation, the irradiation diameters of the laser beams, and the irradiating positions of the laser beams and the like. For example, the length of the weld bottom surface 72 in a direction orthogonal to the boundary surface 64 of the first member 60 and the second member 62 (i.e., length A of the weld bottom surface 72) may be increased by, for example, increasing the number of laser beams, widening the laser beam intervals, or using laser beams with relatively large laser irradiation diameters, or the like.

Also, the weld depth of the weld portion 70 (typically, the length of the weld portion 70 in the weld depth direction on a plane that includes the boundary surface 64 of the first member 60 and the second member 62, i.e., the length D described above) may be increased by, for example, increasing the output intensity of the laser beams, or making the laser beam intervals narrower or the like.

Also, regarding the laser beam arranged closest to the outside wide surface 62c of the second member 62, from among the plurality of laser beams, the distance in the weld depth direction from the outer surface of the weld portion 70 on the plane that includes the boundary surface 64 of the first member 60 and the second member 62, to the boundary 74 between the non-weld portion of the second member 62 and the weld portion 70 on the outside wide surface 62c of the second member 62 (i.e., the distance d described above), may be increased by, for example, bringing the irradiating position of the laser beam closer to the outside wide surface 62c of the second member 62, or increasing the output intensity of the laser beam or the like.

The sealed battery described here is a sealed battery in which the case main body and the sealing plate are joined together by welding, the joint strength at the boundary between the case main body and the sealing plate is stably ensured, and fracturing at the boundary portion of the non-weld portion and a weld portion of welding members is reduced. For example, even if there is variation in the manufacturing process (e.g., variation in the sizes of the case main body and the sealing plate, or variation in the welding position, or the like), a high level of strength (typically the fracture strength) of the weld portion of the case main body and the sealing plate is able to be displayed. That is, the battery described here is a battery in which the inside of the battery case is highly reliably hermetically sealed. Therefore, this battery may be suitably used as a driving battery mounted in a vehicle such as a plug-in hybrid vehicle (PHV), a hybrid vehicle (HV), or an electric vehicle (EV) or the like. Also, according to the invention, a vehicle in which the battery described here is preferably provided as a power source (typically a battery pack in which a plurality of batteries are electrically connected together), is provided.

Hereinafter, an example (a test example) related to the invention will be described, but the invention is in no way limited to this example (test example).

<Welding of the Case Main Body and the Sealing Plate>

The case main body of the battery is closed off by the sealing plate by the procedure described below. First, a sealing plate that is made of an aluminum alloy with an alloy number designated by JIS of A1050-O, and is 1.4 mm thick, was prepared. Also, a case main body made of an aluminum alloy with an alloy number designated by JIS of A3003-O, and is 0.4 mm thick, was prepared. Then, after attaching an electrode body that is a power generating element to the sealing plate by a predetermined procedure, the electrode body was inserted into the case main body, and the sealing plate was fitted into the opening of the case main body so as to form a lid. More specifically, the case main body and the sealing plate were arranged such that the outer peripheral side surface of the sealing plate butts against the inner wall surface of the side wall of the case main body, and the outer surface of the sealing plate is flush with the open end surface of the battery case (i.e., such that these are on the same plane). That is, here, the sealing plate is the first member, and the case main body is the second member. Then, a predetermined region that includes a portion of the boundary surface of the case main body and the sealing plate is welded and joined in a direction along the boundary surface, by any one of welding method 1 to welding method 4 below. As a result, a total of 22 types of batteries (Examples 1 to 22), each with a differently shaped weld portion, were manufactured.

[Welding Method 1]

Welding method 1 will now be described. FIG. 5 is a view showing a frame format of the laser irradiating position in welding method 1. For welding, four fiber lasers with a beam diameter (laser irradiation diameter) of 0.04 mm each were prepared, and these fiber lasers were used with the laser beams (1 to 4 in the drawing) arranged lined up in a row in a direction orthogonal to the welding direction at the laser irradiating positions. These laser beams 1 to 4 run parallel at a speed (welding speed) of 400 mm/second, with the four laser beams 1 to 4 irradiating simultaneously so as to all be the same laser intensity. The welding is performed by continuously keyhole welding with the laser beams 1 to 4. Also, the welding is performed going around along the boundary surface 64 of the case main body 32 and the sealing plate 34. Here, the laser intensity and the intervals of the laser beams are set within a range in which the weld portion has a weld bottom surface that is the deepest portion in the depth direction of the weld, and is substantially parallel to a virtual plane orthogonal to the depth direction of the weld, and the weld portion has a shape that extends to an outer surface of the case main body (the second member), which is a surface on the opposite side from the boundary surface of the sealing plate (the first member) in the thickness direction. The laser irradiating position is adjusted such that the center in the parallel direction of the four laser beams is aligned with the boundary surface 64 of the case main body 32 and the sealing plate 34. Also, welding was performed in a total of 10 kinds of welding conditions in which the shape of the weld portion is different, by suitably adjusting the laser intensity and the intervals of the laser beams (Example 1 to Example 10).

[Welding Method 2]

Figure 6:
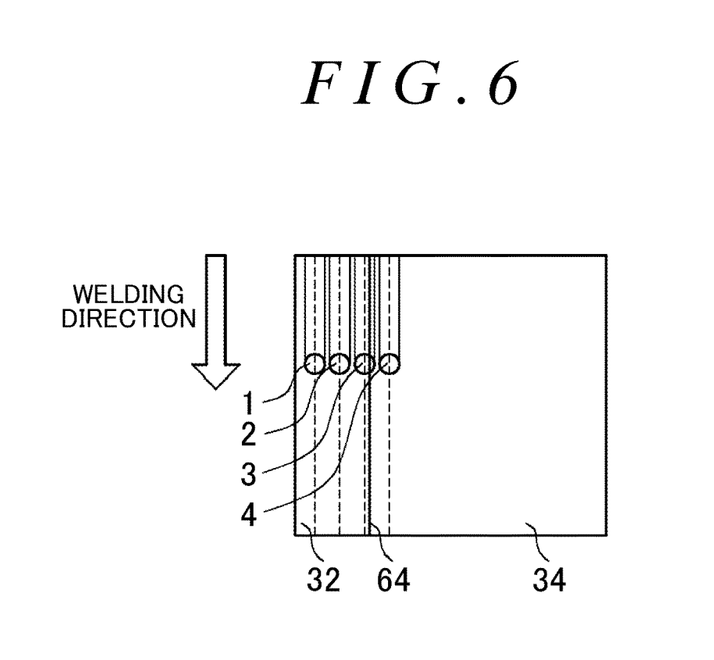
FIG. 6 is a view showing a frame format of a laser irradiation procedure according to [Welding method 2] shown in a test example, in which the laser irradiating position is viewed from the laser irradiating direction.

Next, welding method 2 will be described. In welding method 2, welding was performed in a total of 10 kinds of welding conditions in which the shape of the weld portion is different, by the same procedure as welding method 1 described above, except that the laser irradiating position was moved 0.1 mm to the case main body 32 side, as shown in FIG. 6 (Examples 11 to 20). More specifically, a battery according to Example 11 was manufactured by moving the laser irradiating position in the welding conditions when manufacturing a battery according to Example 1, and similarly, batteries according to Examples 12, 13, . . . 20 were manufactured by moving the laser irradiating position in the welding conditions when manufacturing batteries according to Examples 2, 3, . . . 10.

[Welding Method 3]

Figure 7:
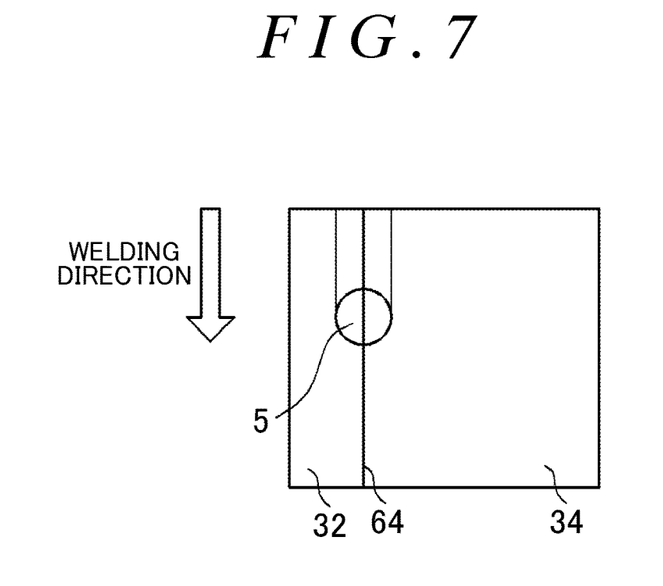
FIG. 7 is a view showing a frame format of a laser irradiation procedure according to [Welding method 3] shown in a test example, in which the laser irradiating position is viewed from the laser irradiating direction.
Figure 8:
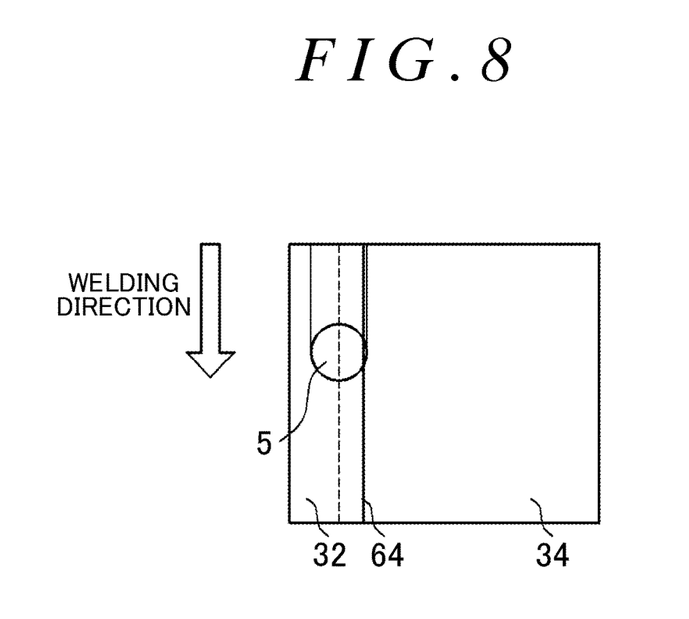
FIG. 8 is a view showing a frame format of a laser irradiation procedure according to [Welding method 4] shown in a test example, in which the laser irradiating position is viewed from the laser irradiating direction.

Next, welding method 3 will be described. In welding method 3, a fiber laser (reference character 5 in the FIG. 7) with a beam diameter (laser irradiation diameter) of 0.3 mm was used alone for welding, and a laser beam was irradiated such that the center of the laser beam 5 was aligned with the boundary surface 64 of the case main body 32 and the sealing plate 34, as shown in FIG. 7. Also, welding was performed by continuously welding going around at a speed (welding speed) of 400 mm/second along the boundary surface 64 of the case main body 32 and the sealing plate 34 (Example 21).

[Welding Method 4]

Next, welding method 4 will be described. In welding method 4, welding was performed by the same procedure as welding method 3 described above except that the laser irradiating position was moved 0.1 mm to the case main body side (Example 22).

<Shape of the Weld Portion>

Regarding the shape of the weld portion of the batteries according to Examples 1 to 22 described above, FIGS. 11 to 13 are sectional views in a direction orthogonal to the boundary surface of the case main body 32 and the sealing plate 34, which is a direction along the weld depth direction of the weld portion 70. Also, i) the depth (D (mm)) in the weld depth direction of the weld portion 70 on the plane that includes the boundary surface of the case main body 32 and the sealing plate 34, ii) the distance (d (mm)) in the weld depth direction from the outer surface of the weld portion 70 on the plane that includes boundary surface of the case main body 32 and the sealing plate 34, to the boundary between the non-weld portion of the case main body 32 and the weld portion 70 on the outer surface of the case main body 32 that is on the opposite side, in the thickness direction, from the boundary surface of the case main body 32 and the sealing plate 34, iii) the thickness (W (mm)) of the case main body 32, and iv) the length (A (mm)) of the weld bottom surface in a direction orthogonal to the boundary surface of the case main body 32 and the sealing plate 34, were measured. The size of d with respect to D described above, and the size of A with respect to W described above, for the battery according to each example, are shown in FIGS. 11 to 13.

<Fracture Test>

Figure 9:
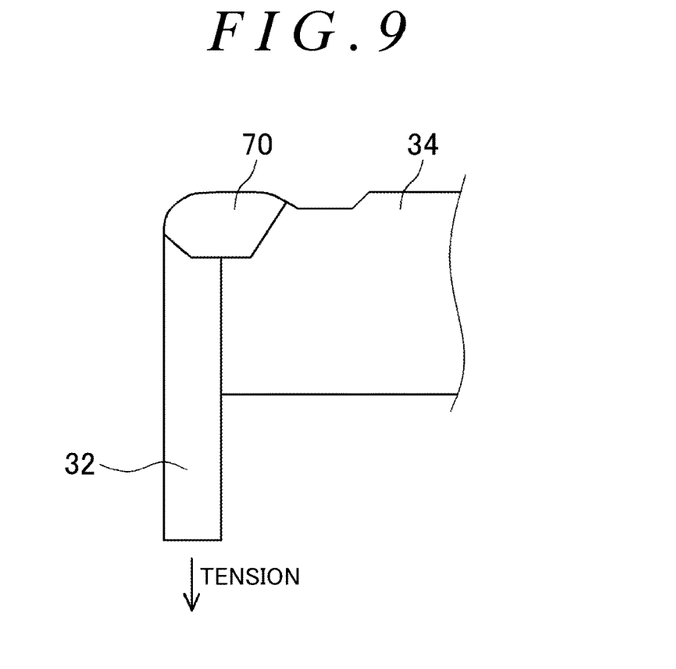
FIG. 9 is a view showing a frame format of a fracture test procedure shown in the test example.

Next, a fracture test described below (see FIG. 9) was performed with the battery case of the battery according to each example described above, in order to check the strength of the weld portion 70 of the case main body 32 and the sealing plate 34. First, for the battery case of each battery, a portion that includes the weld portion was cut in a direction orthogonal to the boundary between the case main body 32 and the sealing plate 34, which is a direction along the weld depth direction of the weld portion 70, and a test piece having a thickness of 5 mm that includes the weld portion was cut out. Next, for the test piece in each example, the sealing plate 34 was fixed, and the case main body 32 was pulled (i.e., tension was applied) in a direction along the boundary surface of the sealing plate 34 and the case main body 32 (i.e., a direction along the weld depth direction of the weld portion), and the tensile strength (N) when the weld portion 70 fractured was measured. Also, regarding the length (mm) of the fracture portion that fractured due to the tension, the length when the test piece was viewed from the cut surface was measured, and the fracture strength (N/mm) was obtained by dividing the tensile strength (N) by the length (mm) of the fracture portion. For the battery according to each example, the fracture test described above was performed, and the shape of the fracture portion of the case main body 32 after the weld portion fractured is shown in the corresponding column in FIGS. 11 to 13. Ten batteries were manufactured for the battery according to each example, and the fracture test was performed on each of the batteries. Also, those batteries in which the average measured fracture strength of the 10 batteries was 35 N/mm or more were given an assessment of "O", and those batteries in which the average measured fracture strength of the 10 batteries was less than 35 N/mm were given an assessment of "X". The results are shown in the corresponding column in FIGS. 11 to 13.

Figure 11:
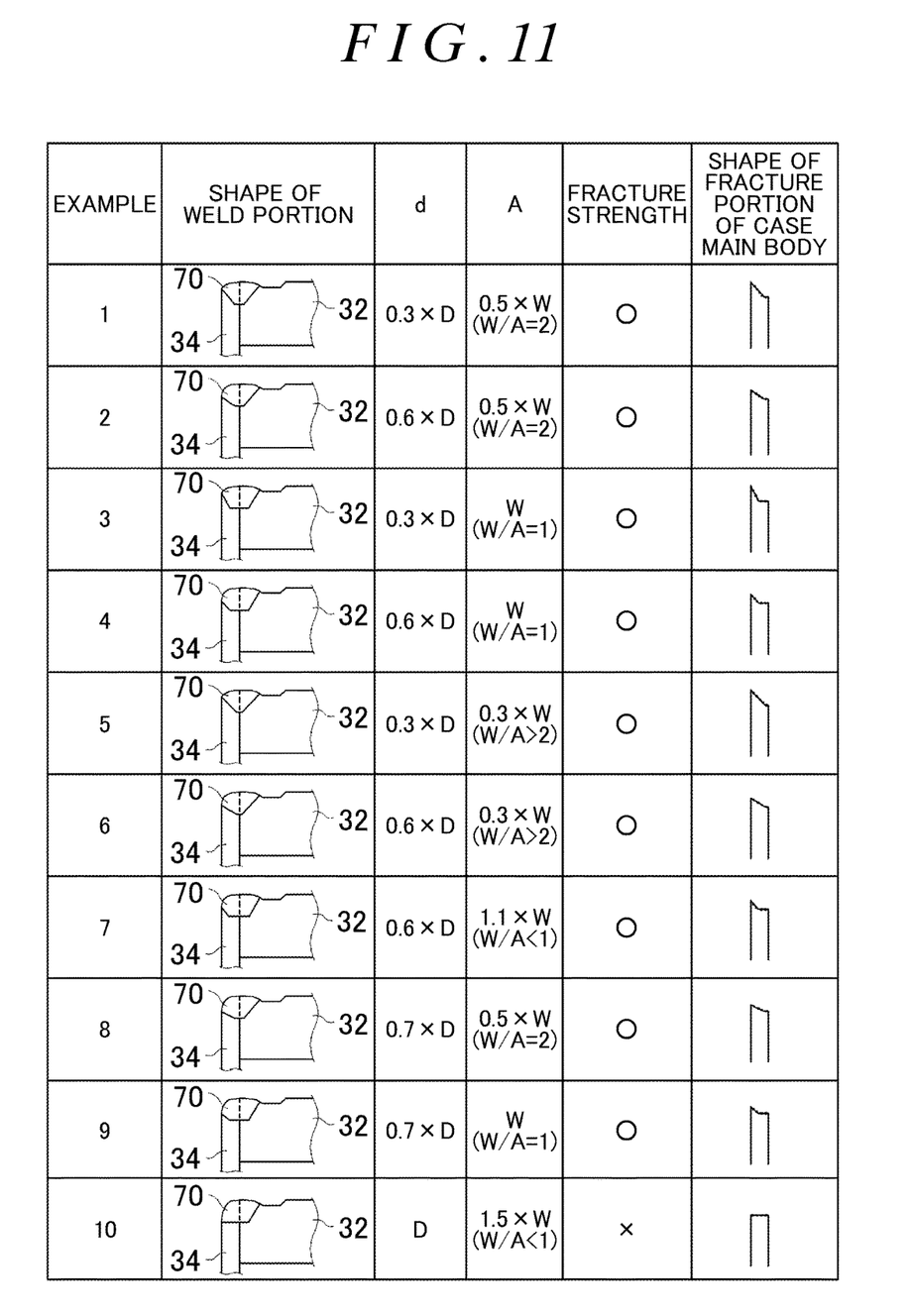
FIG. 11 is a table that shows results of a fracture test performed with the battery case of the battery according to each test example.
Figure 12:
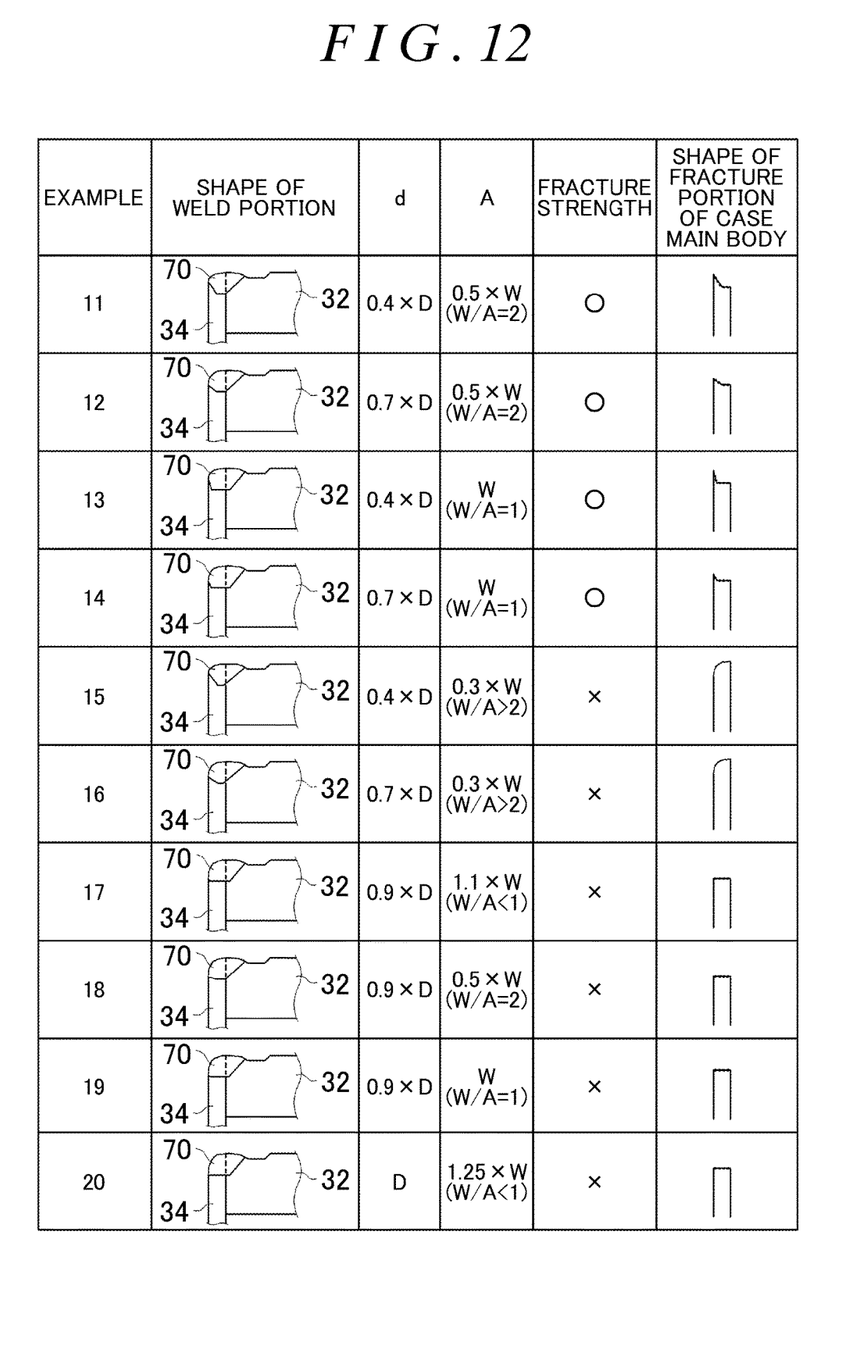
FIG. 12 is a table that shows results of a fracture test performed with the battery case of the battery according to each test example.
Figure 13:
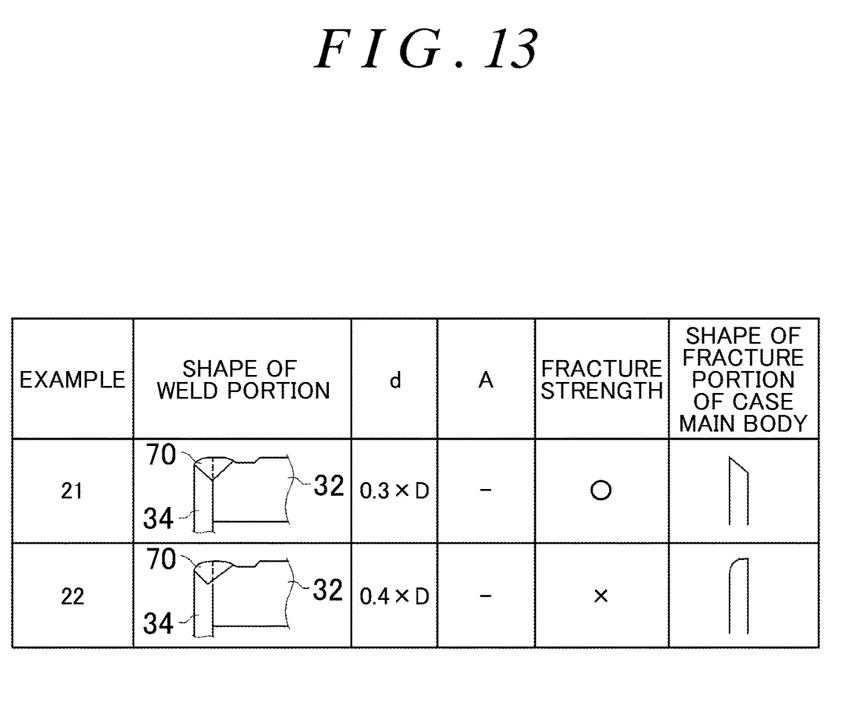
FIG. 13 is a table that shows results of a fracture test performed with the battery case of the battery according to each test example.

As shown in FIGS. 11 and 12, Examples 1 to 9 and 11 to 14 had high fracture strengths. With these examples, the shape of the weld portion is a shape that has a weld bottom surface that is substantially parallel to a virtual plane that is orthogonal to the depth direction of the weld, on the deepest portion in the weld depth direction of the weld portion, and the boundary surface of the case main body and the sealing plate intersects with the weld bottom surface. Therefore, a desired weld depth can be ensured for the weld portion on the plane that includes the boundary surface of the case main body and the sealing plate, so it is thought that fracturing at the weld portion on the plane that includes the boundary surface of the case main body and the sealing plate is able to be inhibited. Also, in Examples 1 to 9 and 11 to 14, the shape of the weld portion was d≤0.7×D. Therefore, the area of the boundary between the weld portion and the non-weld portion of the case main body is able to be sufficiently ensured, so it is thought that fracturing at the boundary portion of the weld portion and the non-weld portion of the case main body is able to be inhibited.

Here, in Examples 1, 3, and 5, in which the shape of the weld portion is a shape that has a weld bottom surface that is substantially parallel to the virtual plane that is orthogonal to the depth direction of the weld on the deepest portion in the weld depth direction of the weld portion, the fracture strength was higher than it was with Example 21 that does not have the weld bottom surface. In each of Examples 1, 3, 5, and 21, the deepest portion in the weld depth direction of the weld portion is positioned on a plane that includes the boundary surface of the case main body and the sealing plate (i.e., the deepest portion in the weld depth direction of the weld portion intersects with the boundary surface of the case main body and the sealing plate), and d=0.3×D. That is, it was confirmed that the strength (fracture strength) of the weld portion is able to be improved by shaping the weld portion so that it has the weld bottom surface. This is thought to be due to the fact that the area of the boundary between the weld portion and the non-weld portion of the case main body increases by providing the weld bottom surface.

On the other hand, Examples 10, 15 to 20, and 22 had low fracture strengths. In Examples 15 and 16, the boundary surface of the case main body and the sealing plate does not intersect with the weld bottom surface of the weld portion, that is, the deepest portion in the weld depth direction of the weld portion is not positioned on a plane that includes the boundary surface of the case main body and the sealing plate. Therefore, the weld depth of the weld portion on the plane that includes the boundary surface of the case main body and the sealing plate was less than the desired depth (here, 0.6 mm), which is thought to be why fracturing easily occurred at the boundary surface of the case main body and the sealing plate. With Example 22 as well, similarly, the deepest portion in the weld depth direction of the weld portion was offset from the plane that includes the boundary surface of the case main body and the sealing plate, which is thought to be why fracturing easily occurred at the boundary surface of the case main body and the sealing plate. Also, in Examples 10 and 17 to 20, the shape of the weld portion is d>0.7×D, so the area of the boundary between the weld portion and the non-weld portion of the case main body is small, which is thought to be why fracturing easily occurred at the boundary portion of the weld portion and the non-weld portion of the case main body.

In Examples 1 to 4 in which W/A≤2, even if the laser irradiating position is off (Examples 11 to 14), the length of the weld portion in the weld depth direction on the plane that includes the boundary surface of the case main body and the sealing plate was able to be stably ensured. On the other hand, in Examples 5 and 6 in which W/A>2, when the laser irradiating position was off (Examples 15 and 16), it was difficult to ensure the desired length (here, 0.6 mm) as the length of the weld portion in the weld depth direction on the plane that includes the boundary surface of the case main body and the sealing plate. Also, in Example 7 in which W/A<1, when the laser irradiating position was off (Example 17), the distance d tended to be small. From all of this, it was confirmed that 1≤W/A≤2 is more preferable considering variation when manufacturing the battery (e.g., variation in welding position and variation in the sizes of the members).

From these results, it was confirmed that the welding method according to example embodiments of the invention makes it possible to provide a battery in which the case main body and the sealing plate are welded together with high weld quality.

While specific examples of the invention have been described in detail, the example embodiments and examples described above are no more than examples, and are not intended to limit the scope of the claims. Various modifications and variations of the specific examples described above are also included in the technology described in the scope of the claims.

What is claimed is:

1. A sealed battery comprising:
   a case main body that has an opening for housing an electrode body; and
   a sealing plate that closes off the opening, the sealing plate being joined to the case main body by a weld portion that includes a portion of a boundary surface of the case main body and the sealing plate, and the weld portion being provided along the boundary surface, wherein
   the weld portion includes a weld bottom surface that is the deepest portion in a depth direction of a weld, the depth direction of the weld being along the boundary surface, the weld bottom surface intersecting with the boundary surface, and the weld bottom surface being substantially orthogonal to the depth direction;

the weld portion reaches a first surface of a second member, the second member being a member from among the case main body and the sealing plate, a thickness direction of the second member being perpendicular to the boundary surface, the first surface being a surface on an opposite side from the boundary surface in the thickness direction of the member; and a distance from a first position to the weld bottom surface on a first virtual plane, the first position being a position of an outer surface of the weld portion, the first position being on the first virtual plane, the first virtual plane including the boundary surface, the first virtual plane being parallel to the boundary surface, the outer surface being a surface of the weld portion, the outer surface facing outside of the sealed battery, is greater than a distance from a second position to a position of the deepest portion of the weld portion in the depth direction on a second virtual plane, the second position being a position where a line that extends from the first position intersects with the second virtual plane, the second virtual plane being parallel to the boundary surface, the second virtual plane including the first surface, the line extending in a direction perpendicular to the second virtual plane.

2. The sealed battery according to claim 1, wherein
when the distance from the first position to the weld bottom surface on the first virtual plane is D, and
the distance from the second position to the position of the deepest portion of the weld portion in the depth direction on the second virtual plane is d,
$d \leq 0.7 \times D$ is satisfied.

3. The sealed battery according to claim 2, wherein
when a thickness of a first member is W, the first member being a member from among the case main body and the sealing plate, a direction along the boundary surface corresponding to a thickness direction of the first member, and a length of the weld bottom surface in a direction orthogonal to the boundary surface is A,
$1 \leq W/A \leq 2$ is satisfied.

4. The sealed battery according to claim 3, wherein
the thickness W is equal to or less than 1 mm.

5. The sealed battery according to claim 3, wherein
the distance D is equal to or less than 2 mm.

6. The sealed battery according to claim 1, wherein
the first member is the sealing plate, and the second member is the case main body.

* * * * *